July 19, 1960  E. SALLER  2,945,796
PROCESS OF PURIFYING CARBON TETRACHLORIDE
Filed June 15, 1959
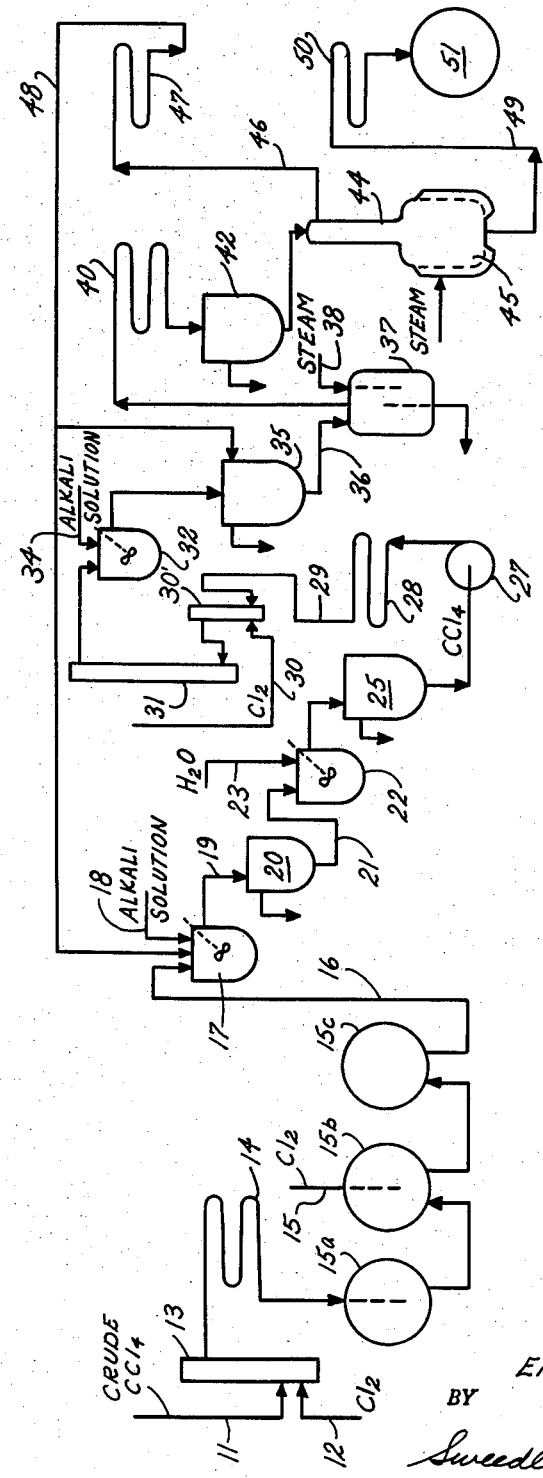
INVENTOR.
ERIK SALLER
BY
Sweedler & Zucker
ATTORNEYS

United States Patent Office 2,945,796
Patented July 19, 1960

2,945,796

PROCESS OF PURIFYING CARBON TETRACHLORIDE

Erik Saller, Tonawanda, N.Y., assignor to Food Machinery and Chemical Corporation, New York, N.Y., a corporation of Delaware Filed June 15, 1959, Ser. No. 820,363

6 Claims. (Cl. 204—163)

This invention relates to the purification of carbon tetrachloride containing sulfur compounds, chloroform and at times other impurities.

In the specification all percentages and parts, unless otherwise indicated, are given on a weight basis.

One of the principal methods for the preparation of carbon tetrachloride consists in chlorinating carbon bisulfide. The product of the reaction is principally a mixture of carbon tetrachloride and sulfur monochloride ($S_2Cl_2$) in equimolar proportions. These materials are separated by fractional distillation, the crude carbon tetrachloride is purified, and the sulfur monochloride is treated to recover sulfur and chlorine values therefrom. This treatment involves utilization of the sulfur monochloride as a chlorinating agent to react with carbon bisulfide to produce carbon tetrachloride and sulfur. Such procedures result in the production of carbon tetrachloride containing as impurities sulfur chloride (sulfur monochloride, sulfur dichloride, or a mixture of both), chloroform, carbon bisulfide and at times non-volatile impurities, chiefly iron.

It is among the objects of the present invention to provide an efficient process of purifying carbon tetrachloride to produce a chemically pure material, meeting commercial specifications including American Chemical Society specifications for reagent grade materials for laboratory purposes.

Other objects and advantages of this invention will be apparent from the following description thereof.

In accordance with this invention, crude carbon tetrachloride is first chlorinated in the presence of a chlorination catalyst to convert the sulfur compounds to sulfur hexachloride ($SCl_4+Cl_2$). The amount of chlorine used in this chlorination is equal or in excess above the stoichiometric amount required to react with all the sulfur compounds present to form sulfur hexachloride; an excess as much as double the stoichiometric amount may be used, if desired. The chlorinated material is then washed with aqueous alkali, preferably caustic soda, to effect removal of the sulfur hexachloride. Thereafter chloroform is removed by subjecting the carbon tetrachloride to photochemical chlorination. The chloroform is thus converted to carbon tetrachloride; hydrogen chloride is simultaneously produced. The chlorinated material is then given a second aqueous alkali wash to neutralize the hydrogen chloride in and remove residual chlorine from the photochlorinated material. If the carbon tetrachloride contains non-volatile impurities such as iron, the carbon tetrachloride, after the second alkali wash, is subjected to steam distillation to effect separation of the carbon tetrachloride as overhead vapor from the non-volatile impurities. The carbon tetrachloride may be separated from non-volatile impurities by filtration instead of by steam distillation. The carbon tetrachloride steam mixture is condensed and dried, preferably by fractional distillation.

It is important to effect the chlorination of the crude carbon tetrachloride to chlorinate the carbon bisulfide and sulfur chlorides to sulfur hexachloride before effecting the removal of the chloroform because the sulfur compounds may decompose to form sulfur or sulfides which interfere with the subsequent photochlorination. By removing the sulfur compounds first, this hazard is eliminated. The chlorination reaction is more rapid at higher temperatures and the chlorinated material is therefore heated to a temperature of from 40° C. to 75° C. As the temperature is raised, the solubility of chlorine is decreased, so that less than the amount needed for the reaction may be absorbed in the chlorinator, if the temperature is too high. Temperatures above about 75° C. are therefore avoided at atmospheric pressure; under superatmospheric pressures higher temperatures, but below the boiling point of the carbon tetrachloride at such pressures, may be used.

As the catalyst, any chlorination catalyst such as ferric chloride, iron, or antimony pentachloride, may be used. A soluble iron compound providing a few parts (½ to 10 parts) per million of iron is the preferred catalyst and may be provided by adding anhydrous ferric chloride or metallic iron, the latter being dissolved slowly by the action of the dissolved chlorine. If the chlorinator and aging tanks through which the mixture of chlorine and carbon tetrachloride passes are made of unprotected iron, corrosion of the equipment may provide sufficient catalyst for the reaction. When operating with continuous flow, the aging tanks should be of such size as to provide a retention time of about 4 to 12 hours or longer, preferably about 8 hours.

The chlorinated material is washed thoroughly with the aqueous alkaline solution; it is important that good contact between the alkali and the chlorinated material be obtained, and vigorous agitation should therefore be used. The pH of the mixture is controlled within the range of about 8 to 11, preferably about 10, to avoid or minimize formation of chloroform due to contact of the chlorinated carbon tetrachloride with iron or other metals in the presence of moisture. The alkali wash is preferably carried out in glass lined or other equipment in which the mixture does not come in contact with iron or other metal which catalyzes the formation of chloroform.

As the alkali employed for either or both alkaline washes, the hydroxides or carbonates of the alkali (sodium or potassium) and alkaline earth (e.g. calcium) metals may be used. Sodium hydroxide is preferred because of its ease of handling and effectiveness. Best results are obtained when the washing is carried out at 50° C. to 60° C. and this temperature is automatically maintained by mixing the sodium hydroxide in the form of a 4% solution at about 25° C. in sufficient amount to maintain the pH within the range of 8 to 11; from about 1 to about 2 parts of such alkaline solution (sodium hydroxide) are mixed with each part of chlorinated carbon tetrachloride.

A small amount of the alkaline solution remains suspended or entrained in the carbon tetrachloride after the two phases are separated, and it is preferred, although not essential to wash the carbon tetrachloride with water to remove traces of the alkaline wash solution. The water is then separated, preferably at a temperature of about 20° C. to 40° C., prior to the photochlorination.

The photochlorination is desirably carried out by passing carbon tetrachloride at a temperature of from 40° C. to 60° C. together with an excess of chlorine over and above the stoichiometric amount required to react with all of the chloroform, say such excess of the order of 50% to 500%, through one or more transparent containers through which light from mercury vapor lamps are passed. Instead of mercury vapor lamps, other sources of actinic radiation such as incandescent lamps, electric arcs, or fluorescent lamps may be used.

The apparatus used for the photochlorination may take various forms. A suitable apparatus consists of two concentric glass tubes having a mercury arc lamp in the inner tube and arranged so that the carbon tetrachloride passes through the annular space between the tubes. For a greater throughput, a number of units are arranged in parallel, the number used depending on the desired capacity.

The glass surfaces separating the light source from the carbon tetrachloride should be kept clean so as to maintain high transparency to the light.

The carbon tetrachloride subjected to photochlorination may initially contain 200 or more parts per million chloroform. This concentration may be readily reduced by the above described photochlorination treatment to any level meeting specifications, i.e. to a level as low as about 100 p.p.m. or less, if desired.

After the photochlorination, the carbon tetrachloride is given an alkali wash to effect neutralization of hydrogen chloride and removal of residual chlorine. Preferably this alkali wash is controlled within a pH range of 8 to 11, preferably about 10, to minimize alkali consumption.

The thus partially purified carbon tetrachloride is subjected to distillation to remove overhead water and $CCl_4$ as an azeotropic mixture, and any volatile acids which may be present. Pure $CCl_4$ meeting American Chemical Society specifications, is removed as bottoms.

The accompanying drawing is a flow sheet showing a preferred arrangement of equipment for practicing the purification procedure of this invention.

Referring to this drawing, crude carbon tetrachloride passes through line 11 into a chlorinating tower 13 which is supplied with chlorine through line 12. From the tower the chlorinated material passes through the heater 14 to one or more aging tanks. A single large tank may be used for this purpose, or several smaller tanks 15a, 15b, and 15c. The aging may be carried out batchwise using two or more tanks, but preferably is carried out continuously using several tanks connected in series. The time required for the aging is from 4 to 12 hours, preferably about 8. Desirably additional chlorine is added through line 15 to the crude passing through the aging tanks.

From the aging tank 15c the crude passes through line 16 to the wash tank 17, equipped with an efficient agitator, and is thoroughly mixed with a solution of alkali supplied through line 18. The mixture overflows through line 19 to tank 20, where the two liquid phases separate. The spent alkaline solution is drawn off from the upper part of tank 20, while the carbon tetrachloride passes from the bottom of tank 20 through line 21 to a water-wash tank 22, equipped with a stirrer, where it is agitated with water introduced through line 23. The mixture then passes to separator 25 where the two phases separate.

The aqueous layer is removed, and the carbon tetrachloride layer, now at approximately ambient temperature, is pumped by pump 27 through heater 28 where it is heated to approximately 50° C., through line 29, into the chlorine absorber 30' where chlorine from line 30 is added. The mixture from the chlorine absorber 30' flows to the photochlorinator 31. The carbon tetrachloride leaving the photochlorinator, now substantially free of chloroform but containing a significant amount of hydrogen chloride formed in the photochlorination, is agitated in washer 32 with an alkaline solution introduced through line 34. The spent alkaline solution is separated in separator 35, from which it overflows to the sewer or other suitable disposal point.

If the washed carbon tetrachloride contains non-volatile impurities, it may be subjected to filtration to separate such non-volatile impurities or may be passed through line 36 to still 37 from which it is steam distilled with the aid of steam introduced through line 38. The distillate, consisting of vapors of carbon tetrachloride and water, is condensed in heat exchanger 40 and passes into receiver 42. Here most of the water separates and is withdrawn, leaving carbon tetrachloride saturated with water.

The wet carbon tetrachloride is distilled in a fractionating column 44. The distillate consists of a constant boiling mixture of carbon tetrachloride and water, containing approximately 4% by weight of the latter. All of the water and enough of the carbon tetrachloride to form the constant boiling mixture are distilled off through line 46 to condenser 47. The condensate passes through line 48 to washing tanks 17 or separator 35 or in part to tank 17 and the remainder to separator 35.

When treating carbon tetrachloride containing little or no volatile impurities, the washed carbon tetrachloride is passed from separator 35 directly to the top of fractionating column 44, bypassing still 37, heat exchanger 40 and receiver 42.

The underflow from the kettle 45 of the drying still is the final purified product. It passes through line 49 to a cooler 50 and thence to the product storage tank 51.

The following example carried out in equipment of the type shown in the drawing is given for illustrative purposes; it will be appreciated that this invention is not limited to this example.

1,000 pounds of crude carbon tetrachloride containing approximately 1.5% sulfur monochloride and sulfur dichloride calculated as sulfur monochloride, 1,000 p.p.m. of carbon disulfide, and 200 p.p.m. of chloroform were treated with 60 pounds of chlorine at a temperature of 50° C. The chlorination was carried out in the presence of 0.0003% ferric chloride based on the weight of crude carbon tetrachloride. The reaction mixture from the chlorination was passed through three tanks in series, with an average retention time in each tank of about 3 hours to permit the chlorination reaction to go to completion.

1,060 pounds of chlorinated material were agitated with 1,150 pounds of dilute sodium hydroxide solution (4% concentration) at a temperature of 50° C.; the pH was 10. The carbon tetrachloride was separated from the alkali solution, washed with water and separated from the latter. Analysis of the washed material showed it contained 2 p.p.m. carbon bisulfide, no detectable amount of sulfur chlorides and approximately 700 p.p.m. chloroform. 0.1% (based on the weight of carbon tetrachloride) chlorine was added to this carbon tetrachloride and the mixture exposed to light from a mercury arc lamp for 5 minutes. Thereafter it was given an alkaline wash similar to that applied after the first chlorination. The chloroform content of the washed material was 100 p.p.m.

The carbon tetrachloride thus produced was steam distilled under atmospheric pressure, producing overhead carbon tetrachloride free of non-volatile impurities but saturated with water. This carbon tetrachloride was subjected to distillation in a fractionating still, removing as bottom dry carbon tetrachloride which did not become cloudy when cooled to −20° C.

The carbon tetrachloride thus produced met existing specifications for purity.

It will be noted the present invention provides an efficient process of purifying carbon tetrachloride to produce a chemically pure grade of carbon tetrachloride.

While the principle of this invention has been explained and exemplified in a manner so that it can be readily practiced by those skilled in the art, it will be understood that various modifications and changes may be made and hence the invention is not to be limited to the above example or disclosure except as set forth in the appended claims.

What is claimed is:

1. A method of purifying crude carbon tetrachloride containing as impurities carbon bisulfide, sulfur chloride and chloroform, which comprises adding chlorine thereto in amount sufficient to convert all of the sulfur compounds to sulfur hexachloride and reacting said sulfur compounds with said chlorine to produce sulfur hexachloride, agitating the chlorinated material with an alkaline solution to effect removal of the sulfur hexachloride from the carbon tetrachloride, separating the carbon tetrachloride from the alkaline solution, photochlorinating the carbon tetrachloride thus separated to convert the chloroform present to carbon tetrachloride, washing the photochlorinated material with an alkaline solution to neutralize the hydrogen chloride formed during the photochlorination and separating the carbon tetrachloride from the alkaline solution.

2. The process as defined in claim 1 in which the initial chlorination is carried out in the presence of a chlorination catalyst at a temperature of 45° C. to 75° C. and the chlorinated material is agitated with sodium hydroxide to produce a mixture having a pH of between 8 and 11.

3. A method of purifying crude carbon tetrachloride containing as impurities carbon bisulfide, sulfur chloride and chloroform, which comprises adding chlorine thereto in amount sufficient to convert all of the sulfur compounds to sulfur hexachloride and reacting said sulfur compounds with said chlorine to produce sulfur hexachloride, agitating the chlorinated material with an alkaline solution to effect removal of the sulfur hexachloride from the carbon tetrachloride, separating the carbon tetrachloride from the alkaline solution, photochlorinating the carbon tetrachloride thus separated to convert the chloroform present to carbon tetrachloride, washing the photochlorinated material with an alkaline solution to neutralize the hydrogen chloride formed during the photochlorination, separating the carbon tetrachloride from the alkaline solution and distilling it to produce a substantially pure, dry carbon tetrachloride.

4. The method of purifying carbon tetrachloride containing as impurities carbon disulfide, sulfur chloride, chloroform, and non-volatile substances which comprises adding chlorine thereto in an amount sufficient to convert all the sulfur compounds contained therein to sulfur hexachloride and reacting said sulfur compounds with said chlorine in the presence of a chlorination catalyst to produce sulfur hexachloride, agitating the chlorinated material with an alkaline solution having a pH between 8 and 11 at a temperature between 50° C. and 60° C., separating the carbon tetrachloride from the alkaline solution, adding chlorine in an amount sufficient to convert the chloroform to carbon tetrachloride and exposing the mixture containing chlorine to actinic radiation, agitating the thus chlorinated material with an alkaline solution to remove acid formed during the chlorination of the chloroform, separating the carbon tetrachloride from the alkaline solution, subjecting the carbon tetrachloride thus separated to steam distillation to remove overhead carbon tetrachloride admixed with water and thus separating the carbon tetrachloride from the non-volatile substances, fractionally distilling the carbon tetrachloride water mixture to remove overhead substantially all the water in the carbon tetrachloride, and withdrawing the dry purified carbon tetrachloride from the distillation.

5. The process of claim 4, in which the temperature in the catalytic chlorination is from about 40° C. to 60° C.

6. The process of claim 4, in which the chlorination catalyst is ferric chloride.

References Cited in the file of this patent

UNITED STATES PATENTS

| | | |
|---|---|---|
| 1,697,483 | Van Arsdel et al. | Jan. 1, 1929 |
| 2,316,736 | Beanblossom et al. | Apr. 13, 1943 |